United States Patent
Ando et al.

(10) Patent No.: US 9,382,867 B2
(45) Date of Patent: Jul. 5, 2016

(54) ABNORMALITY DETERMINATION DEVICE OF VEHICLE AND ABNORMALITY DETERMINATION METHOD

(71) Applicants: Daigo Ando, Nagoya (JP); Kengo Hamada, Kariya (JP)

(72) Inventors: Daigo Ando, Nagoya (JP); Kengo Hamada, Kariya (JP)

(73) Assignees: TOYOTA JIDOSHA KABUSHIKI KAISHA, Toyota (JP); DENSO CORPORATION, Kariya-shi (JP)

( * ) Notice: Subject to any disclaimer, the term of this patent is extended or adjusted under 35 U.S.C. 154(b) by 372 days.

(21) Appl. No.: 13/779,109

(22) Filed: Feb. 27, 2013

(65) Prior Publication Data

US 2013/0238219 A1 Sep. 12, 2013

(30) Foreign Application Priority Data

Mar. 6, 2012 (JP) .................................. 2012-049607

(51) Int. Cl.
| | | |
|---|---|---|
| *B60K 6/20* | (2007.10) | |
| *G06F 19/00* | (2011.01) | |
| *G06G 7/70* | (2006.01) | |
| *F02D 45/00* | (2006.01) | |
| *B60W 10/08* | (2006.01) | |
| *F02D 41/22* | (2006.01) | |
| *B60K 6/445* | (2007.10) | |
| *B60W 20/00* | (2016.01) | |

(52) U.S. Cl.
CPC ................ *F02D 45/00* (2013.01); *B60K 6/445* (2013.01); *B60W 10/08* (2013.01); *B60W 20/50* (2013.01); *F02D 41/22* (2013.01); *B60W 2510/0652* (2013.01); *F02D 2200/1004* (2013.01); *F02D 2200/1012* (2013.01); *F02D 2250/18* (2013.01); *Y02T 10/6239* (2013.01)

(58) Field of Classification Search
CPC ..... B60W 10/08; B60W 10/06; B60W 20/00; Y02T 10/6286; Y02T 10/6239
USPC ............ 180/65.21–65.29; 701/101, 102, 107, 701/114, 115
See application file for complete search history.

(56) References Cited

U.S. PATENT DOCUMENTS

| | | | |
|---|---|---|---|
| 6,845,305 B1 * | 1/2005 | Raftari .................. | B60K 6/445 477/2 |
| 2008/0071441 A1 * | 3/2008 | Nishigaki ............... | F02D 13/02 701/105 |
| 2011/0178690 A1 * | 7/2011 | Fukumura .............. | B60K 6/365 701/101 |
| 2012/0028757 A1 * | 2/2012 | Kimura .................. | B60K 6/365 477/5 |

FOREIGN PATENT DOCUMENTS

| | | |
|---|---|---|
| JP | A-10-285710 | 10/1998 |
| JP | A-2004-251178 | 9/2004 |
| JP | 2008-232072 A | 10/2008 |

* cited by examiner

*Primary Examiner* — Sizo Vilakazi
(74) *Attorney, Agent, or Firm* — Oliff PLC

(57) ABSTRACT

Provided is an abnormality determination device of a vehicle including an engine and a first motor that is configured to output a torque to an output shaft of the engine, the abnormality determination device determining an output abnormality of dropping output of the engine in the vehicle. The abnormality determination device has an abnormality determination unit that determines that an output abnormality of the engine has occurred when an actual torque that is estimated, based on a torque of the first motor, as a torque actually output from the engine falls below a lower limit of an allowable range for a target torque to be output from the engine, and when an amount of increase in a rotational speed of the engine is smaller than a threshold value for misdetermination suppression, which is a threshold value that is larger as the target torque is higher.

7 Claims, 5 Drawing Sheets

F I G . 1
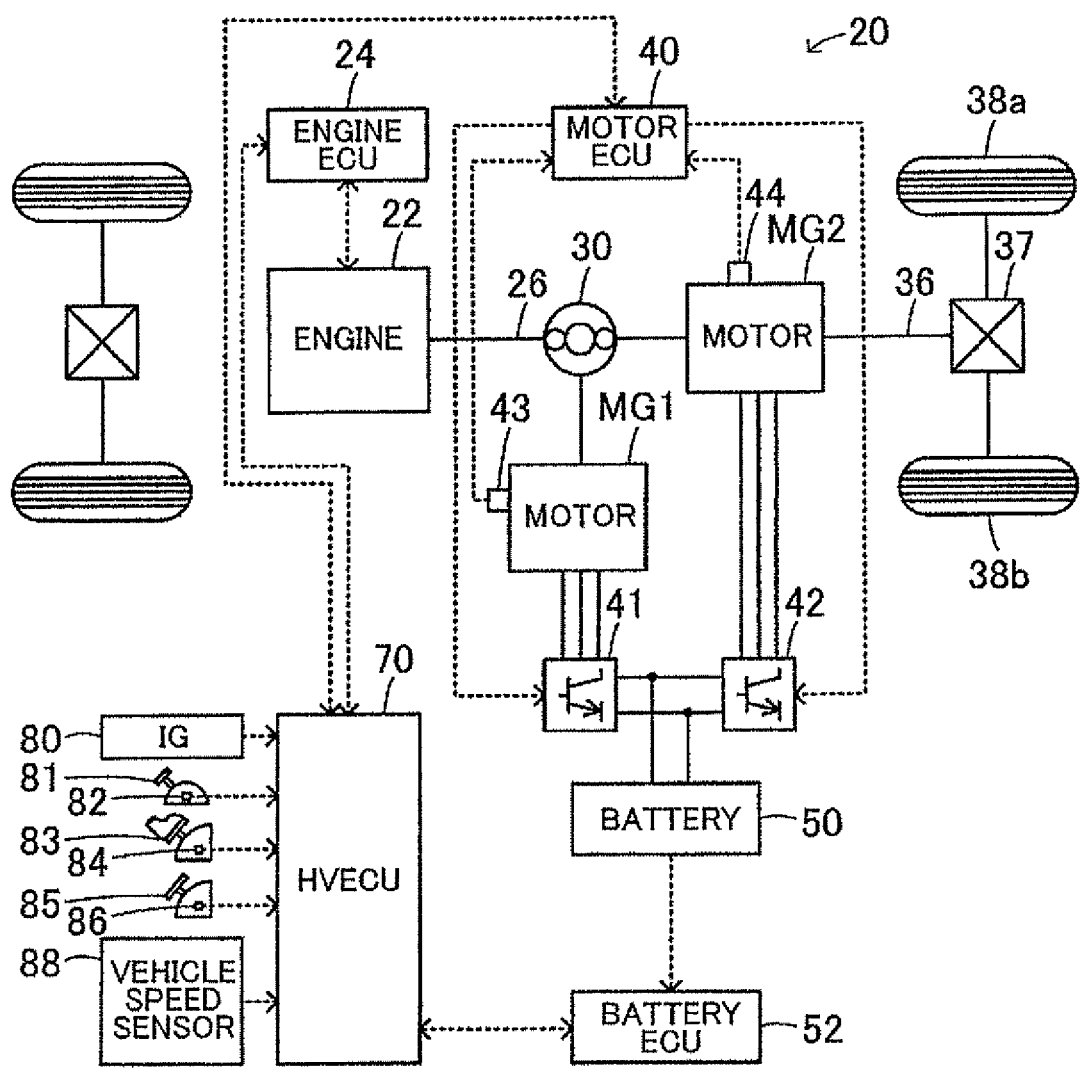

ABNORMALITY DETERMINATION DEVICE OF VEHICLE AND ABNORMALITY DETERMINATION METHOD

INCORPORATION BY REFERENCE

The disclosure of Japanese Patent Application No. 2012-049607 filed on Mar. 6, 2012 including the specification, drawings and abstract is incorporated herein by reference in its entirety.

BACKGROUND OF THE INVENTION

1. Field of the Invention

The invention relates to an abnormality determination device of a vehicle, and more particularly to an abnormality determination device of a vehicle for determining an output abnormality of dropping engine output in a vehicle that includes an engine and a motor that can output torque to an output shaft of the engine.

2. Description of Related Art

As the conventional abnormality determination devices of vehicles of this type, there is proposed a device in which, in a vehicle including an engine and a motor generator that can output torque to a crankshaft of the engine by way of a planetary gear mechanism, the torque outputted by the engine is calculated on the basis of reaction torque that acts on the motor generator, and abnormality determination is performed on the basis of the calculated engine torque (for instance, Japanese Patent Application Publication No. 2004-151178 (JP-2004-251178 A)). In this device, when engine torque calculated after adjustment of ignition timing for warm-up of a purification device of the engine is equal to or greater than a determination criterion torque Tref, an abnormality in the adjustment of the ignition timing is determined to have occurred.

SUMMARY OF THE INVENTION

In such an abnormality determination device of a vehicle, an output abnormality of dropping output of the engine may be determined to have occurred when the actual torque of the engine drops below an allowable range as compared to a target torque, and there is met a condition set in advance relating to the operation state of the engine. A problem in such an abnormality determination device of a vehicle is to determine an output abnormality of the engine more properly. In this device there were instances where, depending on how the condition relating to the engine operation state is set, determination of an output abnormality of the engine was excessively suppressed, or the determination of an output abnormality of the engine was disproportionate.

The abnormality determination device of a vehicle of the invention determines more properly an output abnormality of an engine.

The abnormality determination device of a vehicle according to an aspect of the invention is an abnormality determination device of a vehicle that includes an engine and a first motor that is configured to output a torque to an output shaft of the engine, the abnormality determination device determining an output abnormality of dropping output of the engine in the vehicle, and having an abnormality determination unit that determines that an output abnormality of the engine has occurred when conditions i) and ii) are both satisfied:

i) a condition that an actual torque that is estimated, based on a torque of the first motor, as a torque actually output from the engine falls below a lower limit of an allowable range for a target torque to be output from the engine; and ii) a condition that an amount of increase in a rotational speed of the engine is smaller than a threshold value for misdetermination suppression, which is a threshold value that is larger as the target torque is higher.

In the abnormality determination device of a vehicle according to the above aspect, an output abnormality of the engine is determined to have occurred when an actual torque that is estimated as a torque actually outputted by the engine and is estimated using a torque of the first motor, drops below an allowable range compared to a target torque that is to be outputted by the engine, and when an increment in a rotational speed of the engine is smaller than a threshold value for misdetermination suppression. The threshold value for misdetermination suppression is set to be larger as the target torque becomes higher. Times at which the increment of engine rotational speed becomes greater are times at which the rotational speed of the engine rise, and energy consumption on account of inertia of a rotating system, which includes the engine, increases likewise. Therefore, the torque of the first motor decreases accompanying the decrease in torque from the engine that acts on the first motor, and there is a chance of misdetermination to the effect that an output abnormality, of dropping output torque from the engine, has occurred on account of that decreased torque of the first motor. As a result, not determining that an output abnormality of the engine has occurred, even if the actual torque of the engine drops below an allowable range compared to a target torque when an increment of engine rotational speed is equal to or greater than a threshold value, is effective for suppressing misdetermination. Herein, the decrement in torque of the first motor derived from a same increment of engine rotational speed is uniform; i.e. the decrement in the estimated actual torque of the engine is uniform. By contrast the influence of the decrement of the actual torque is smaller upon output of high torque by the engine than upon output of low torque (in other words, that influence is greater during low torque output by the engine than during high torque output). Therefore, using the threshold value for misdetermination suppression, which is established so as to tend to increase as the target torque of the engine becomes higher, makes it possible to curtail excessive suppression of the determination of an output abnormality, upon output of high torque by the engine, caused by using a comparatively small threshold value, and to curtail the likelihood of disproportionate determination of an output abnormality, upon output of low torque by the engine, caused by using a comparatively large threshold value, and makes it possible to determine an output abnormality of the engine yet more properly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a configuration diagram illustrating schematically the configuration of a hybrid automobile 20 in one working example of the invention;

DETAILED DESCRIPTION OF EMBODIMENTS

Figure 2:
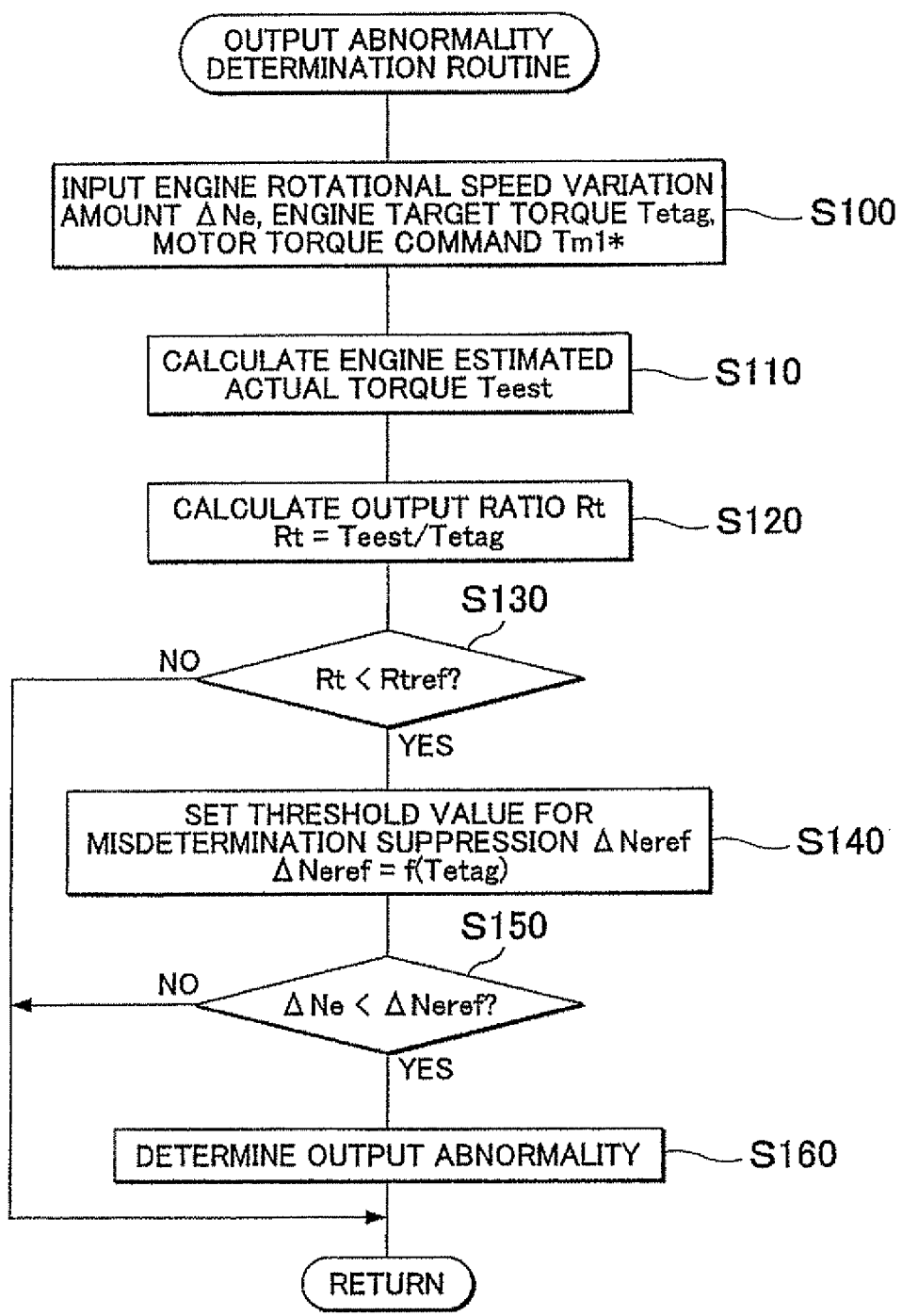
FIG. 2 is a flowchart illustrating an example of an output abnormality determination routine that is executed by a hybrid-vehicle electronic control unit (HVECU) 70.

Modes for carrying out the invention are explained next by way of working examples.

FIG. 1 is a configuration diagram illustrating schematically the configuration of a hybrid automobile 20 in a working example of the invention. As illustrated in the figure, the hybrid automobile 20 of the working example is provided with: an engine 22 that uses gasoline, diesel or the like as a fuel; an engine electronic control unit (engine ECU) 24 that performs driving control of the engine 22; a planetary gear 30 in which a carrier is connected to a crankshaft 26 of the engine 22, and a ring gear is connected to a drive shaft 36 that is coupled to driving wheels 38a, 38b by way of a differential gear 37; a motor MG1 configured in the form of, for instance, a synchronous generator motor, such that a rotor of the motor MG1 is connected to a sun gear of the planetary gear 30; a motor MG2 is configured in the form of, for instance, a synchronous generator motor, such that a rotor of the motor MG2 is connected to the drive shaft 36; inverters 41, 42 for driving the motors MG1, MG2; a motor electronic control unit (motor ECU) 40 that performs driving control of the motors MG1, MG2 through control of the inverters 41, 42; a battery 50 that exchanges electric power with the motors MG1, MG2 by way of the inverters 41, 42; a battery electronic control unit (battery ECU) 52 that manages the battery 50; and an HVECU 70 that controls the vehicle as a whole. In the working example, the HVECU 70 functions as the abnormality determination device of the invention.

Although not shown in the figure, the engine ECU 24 is configured in the form of a microprocessor centered on a central processing unit (CPU). In addition to the CPU, the engine ECU 24 is provided with a read only memory (ROM) for storing processing programs, a random access memory (RAM) for temporarily storing data, input and output ports, and a communication port. The engine ECU 24 receives the input, by way of the input port, of signals from various sensors that detect the operation state of the engine 22. The engine ECU 24 outputs, by way of the output port, various control signals for driving the engine 22. Examples of signals from various sensors that detect the operation state of the engine 22, include, for instance, a crank position θcr from a crank position sensor that detects the rotational position of the crankshaft 26; a cooling water temperature Tw from a water temperature sensor that detects the temperature of cooling water in the engine 22; an in-cylinder pressure Pin from a pressure sensor that is attached to a combustion chamber; a cam position θca from a cam position sensor that detects the rotational position of a camshaft that opens and closes intake valves and exhaust valves that mediate intake and exhaust to/from the combustion chamber; a throttle position SP from a throttle valve position sensor that detects the position of a throttle valve; an intake air amount Qa from an air flow meter that is attached to an intake pipe; an intake air temperature Ta from a temperature sensor that is attached to the intake Pipe; an air-fuel ratio AF from an air-fuel ratio sensor that is attached to an exhaust system; and an oxygen signal O2 from an oxygen sensor that is attached to the exhaust system. Examples of the various control signals for driving the engine 22 include, for instance, a driving signal for a fuel injection valve; a driving signal for the throttle motor, for regulation of the position of the throttle valve; a control signal for an ignition coil that is formed integrally with an igniter; and a control signal for a variable valve timing mechanism that allows modifying the opening and closing timing of the intake valves. The engine ECU 24 communicates with the HVECU 70, and controls the operation of the engine 22 according to a control signal from the HVECU 70, and, as the case may require, outputs to the HVECU 70 data relating to the operation state of the engine 22. The engine ECU 24 computes the rotational speed of the crankshaft 26, i.e. the rotational speed Ne of the engine 22, on the basis of a signal from the crank position sensor, not shown, that is attached to the crankshaft 26.

Although not shown in the figure, the motor ECU 40 is configured in the form of a microprocessor centered on a CPU. In addition to the CPU, the motor ECU 40 is provided with a ROM for storing processing programs, a RAM for temporarily storing data input and output ports, and a communication port. The motor ECU 40 receives the input, by way of the input port, of signals necessary for driving control of the motors MG1, MG2. The motor ECU 40 outputs for instance a switching control signal to switching elements of the inverters 41, 42 by way of the output port, not shown. Examples of signals necessary for driving control of the motors MG1, MG2 include, for instance, rotational positions θm1, θm2 from rotational position detection sensors 43, 44 that detect the rotational position of the rotors of the motors MG1, MG2, and the phase current that is applied to the motors MG1, MG2 as detected by a current sensor, not shown. The motor ECU 40, which communicates with the HVECU 70, performs driving control of the motors MG1, MG2 in accordance with a control signal from the HVECU 70, and, as the ease may require, outputs to the HVECU 70 data relating to the operation state of the motors MG1, MG2. The motor ECU 40 computes rotational angular velocities ωm1, ωm2 and rotational speeds Nm1, Nm2 of the motors MG1, MG2, on the basis of the rotational positions θm1, θm2 of the rotors of the motors MG1, MG2, from the rotational position detection sensors 43, 44.

Although not shown in the figure, the battery ECU 52 is configured in the form of a microprocessor centered on a CPU. In addition to the CPU, the battery ECU 52 is provided with a ROM for storing processing programs, a RAM for temporarily storing data, input and output ports, and a communication port. The battery ECU 52 receives the input of signals necessary for managing the battery 50, for instance a voltage across terminals Vb from a voltage sensor, not shown, disposed between the terminals of the battery 50; a charge and discharge current Ib from a current sensor, not shown, attached to an electric power line that is connected to an output terminal of the battery 50; and a battery temperature Tb from a temperature sensor, not shown, that is attached to the battery 50. As the case may require, the battery ECU 52 communicates with the HVECU 70, and transmits to the latter data relating to the state of the battery 50. On the basis of a cumulative value of charge and discharge current Ib as detected by the current sensor in order to manage the battery 50, the battery ECU 52 computes a storage percentage SOC at that time, which is a proportion of electric power capacity that can be discharged from the battery 50 with respect to the full capacity; and on the basis of the computed storage percentage SOC and the battery temperature Tb, the battery ECU 52 computes input output limits Win, Wout which are the maximum allowable electric power with which the battery 50 may be charged and discharged. The input output limits Win, Wont of the battery 50 can be set by setting a respective base value of the input output limits Win, Wout on the basis of the battery temperature Tb, setting a correction factor for output limitation and a correction factor for input limitation on the basis of the storage percentage SOC of the battery 50, and multiplying then the base values of the set input output limits Win, Wout by a correction factor.

Although not shown in the figure, the HVECU 70 is configured in the form of a microprocessor centered on a CPU. In addition to the CPU, the HVECU 70 is provided with a ROM for storing processing programs, a RAM for temporarily storing data, input and output ports, and a communication port. The HVECU 70 receives, by way of an input port, the input of an ignition signal from an ignition switch 80; a shift position SP from a shift position sensor 82 that detects the operating position of a shift lever 81; an accelerator depression amount Ace from an accelerator pedal position sensor 84 that detects the depression amount of an accelerator pedal 83; a brake pedal position BP from a brake pedal position sensor 86 that detects the depression amount of a brake pedal 85; and a vehicle speed V from a vehicle speed sensor 88. As described above, the HVECU 70 is connected, by way of a communication port, with the engine ECU 24, the motor ECU 40 and the battery ECU 52. The HVECU 70 exchanges various control signals and data with the engine ECU 24, the motor ECU 40 and the battery ECU 52.

In the hybrid automobile 20 of the working example configured as described above, a required torque Tr* that is to be outputted to the drive shaft 36 is calculated on the basis of the vehicle speed V and the accelerator depression amount Acc corresponding to the depression amount of the accelerator pedal by the driver, and the operation of the engine 22, the motor MG1 and the motor MG2 is controlled in such a manner that required motive power corresponding to the required torque Tr* is outputted to the drive shaft 36. The operation control of the engine 22, the motor MG1 and the motor MG2 may involve a torque conversion operation mode in which the operation of the engine 22 is controlled in such a manner that motive power commensurate with the required motive power is outputted by the engine 22, and in which driving control of the motor MG1 and the motor MG2 is performed in such a manner that all the motive power outputted by the engine 22 is converted to torque by the planetary gear 30, the motor MG1 and the motor MG2, and is outputted to the drive shaft 36; a charge and discharge operation mode in which the operation of the engine 22 is controlled in such a manner that motive power commensurate with the sum of the required motive power and electric power necessary for charge and discharge of the battery 50 is outputted by the engine 22, and in which driving control of the motor MG1 and the motor MG2 is performed in such a manner that part or the entirety of the motive power outputted by the engine 22 accompanying charge and discharge of the battery 50 is converted to torque by the planetary gear 30, the motor MG1 and the motor MG2, and, accordingly, required motive power is outputted to the drive shaft 36; and a motor operation mode in which the operation of the engine 22 is discontinued and operation control is performed in such a manner that motive power commensurate with the required motive power from the motor MG2 is outputted to the drive shaft 36. Both the torque conversion operation mode and the charge and discharge operation mode are modes in which the engine 22 and the motors MG1, MG2 are controlled in such a manner that required motive power accompanying the operation of the engine 22 is outputted to the drive shaft 36. Since these modes entail no substantial difference as regards actual control, both will hereafter be referred to collectively as engine operation mode.

In the engine operation mode, the HVECU 70 sets the required torque Tr* that is to be outputted to the drive shaft 36 on the basis of the accelerator depression amount Ace from the accelerator pedal position sensor 84 and the vehicle speed V from the vehicle speed sensor 88. The HVECU 70 calculates a travel power Pdrv* required for travel by multiplying the set required torque Tr* by the rotational speed Nr of the drive shaft 36 (for instance, rotational speed obtained by multiplying the rotational speed Nm2 of the motor MG2 or the vehicle speed V by a conversion factor). The HVECU 70 sets a required power Pe*, as the power to be outputted by the engine 22, by subtracting, from the calculated travel power Pdrv*, a charge and discharge required power Pb* of the battery 50 obtained on the basis of the storage percentage SOC of the battery 50 (positive value upon discharge of the battery 50). Next, the HVECU 70 sets target rotational speed Ne* and a target torque Te* of the engine 22 using an operation line (for instance, fuel consumption optimal operation line) as a relationship between the rotational speed Ne and the torque Te of the engine 22 at which the required power Pe* can be outputted by the engine 22 with good efficiency. Next, the HVECU 70 sets target rotational speed Nm1* of the motor MG1 on the basis of an equation of rotational speed feedback control, given by Expression (1) below, for causing the rotational speed Ne of the engine 22 to attain the target rotational speed Ne*. The HVECU 70 sets a torque command Tm1*, as the torque to be outputted by the motor MG1, on the basis of Expression (2), using the target torque Te* of the engine 22, the target rotational speed Nm1* of the motor MG1, and a gear ratio ρ (number of teeth of the sun gear/number of teeth of the ring gear) of the planetary gear 30. The HVECU 70 sets a torque command Tm2* of the motor MG2 by subtracting, from the required torque Tr*, the torque that acts on the drive shaft 36 by way of the planetary gear 30 when the motor MG1 is driven according to the torque command Tm1*, within the input output limits Win, Wout of the battery 50. The HVECU 70 transmits the set target rotational speed Ne* and target torque Te* to the engine ECU 24, and transmits the torque commands Tm1*, Tm2* to the motor ECU 40. Having received the target rotational speed Ne* and the target torque Te*, the engine ECU 24 performs, for instance, intake air amount control, fuel injection control and ignition control of the engine 22 in such a manner that the engine 22 is operated according to the target rotational speed Ne* and the target torque Te*. Having received the torque commands Tm1*, Tm2*, the motor ECU 40 performs switching control of the switching elements of the inverters 41, 42 in such a manner that the motors MG1, MG2 are driven according to the torque commands Tm1*, Tm2*. Herein, Expression (1) is a mechanical equation for the rotating elements of the planetary gear 30, and Expression (2) is an equation of feedback control for causing the motor MG1 to rotate at the target rotational speed Nm1*, wherein "k1" in the second right term is a proportional-term gain, and "k2" in the third right term is an integral-term gain.

$$Nm1^* = Ne^* \cdot (1+\rho)/\rho - Nm2/Gr/\rho \quad (1)$$

$$Tm1^* = -\rho \cdot Te^*/(1+\rho) + k1(Nm1^* - Nm1) + k2\int(Nm1^* - Nm1)dt \quad (2)$$

In the motor operation mode, the HVECU 70 sets the required torque Tr* that is to be outputted to the drive shaft 36 on the basis of the accelerator depression amount Acc and the vehicle speed V. The HVECU 70 sets a value of 0 for the torque command Tm1* of the motor MG1, and sets the torque command Tm2* of the motor MG2 in such a manner that the required torque Tr* is outputted to the drive shaft 36 within the input output limits Win, Wout of the battery 50. Having received the torque commands Tm1*, Tm2*, the motor ECU 40 performs switching control of the switching elements of the inverters 41, 42 in such a manner that the motors MG1, MG2 are driven according to the torque commands Tm1*, Tm2*.

The HVECU 70 performs driving control in the engine operation mode and the motor operation mode by repeatedly executing, every predefined time (for instance, every several msec), a driving control routine, not shown, that involves setting the torque commands Tm1*, Tm2* of the motors MG1, MG2 and a target operation point (target rotational speed Ne*, target torque Te*) of the engine 22 on the basis of the required torque Tr*, and transmitting the torque commands Tm1*, Tm2* to the engine ECU 24 and the motor ECU 40.

An explanation follows next on the operation of the hybrid automobile 20 in the working example, in particular the operation of determining an output abnormality wherein the output of the engine 22 drops. FIG. 2 is a flowchart illustrating an example of an output abnormality determination routine that is executed by the HVECU 70. This routine is executed repeatedly every predefined time (for instance, every several msec) in parallel to the driving control routine, not shown, during the engine operation mode.

Upon execution of the output abnormality determination routine, the HVECU 70 executes firstly a process of inputting data necessary for determination, for instance, a rotational speed variation amount $\Delta Ne$ which is a variation in the rotational speed Ne of the engine 22, a target torque Tetag to be outputted by the engine 22, and the torque command Tm1* of the motor MG1 for estimating the actual torque that is actually outputted by the engine 22 in accordance with the target torque Tetag (step S100). In the working example, a value (Ne-previous Ne) obtained by subtracting, from the current rotational speed Ne of the engine 22, the rotational speed Ne of the engine 22 before a predefined time (previous Ne), being an execution interval of the driving control routine, not shown, is used as the rotational speed variation amount $\Delta Ne$ of the engine 22. As the rotational speed Ne of the engine 22 there can be used a value that is computed on the basis of the signal of the crank position sensor, not shown, and that is inputted from the engine ECU 24, through communication with the latter. In the working example, there is inputted the torque command Tm1* of the motor MG1 that is set in order to control the motor MG1 according to the driving control routine. In the working example, the target torque Te* that is set in order to control the engine 22 according to the driving control routine before a predefined time, being an execution interval of the driving control routine, is used for the target torque Tetag of the engine 22.

Figure 3:
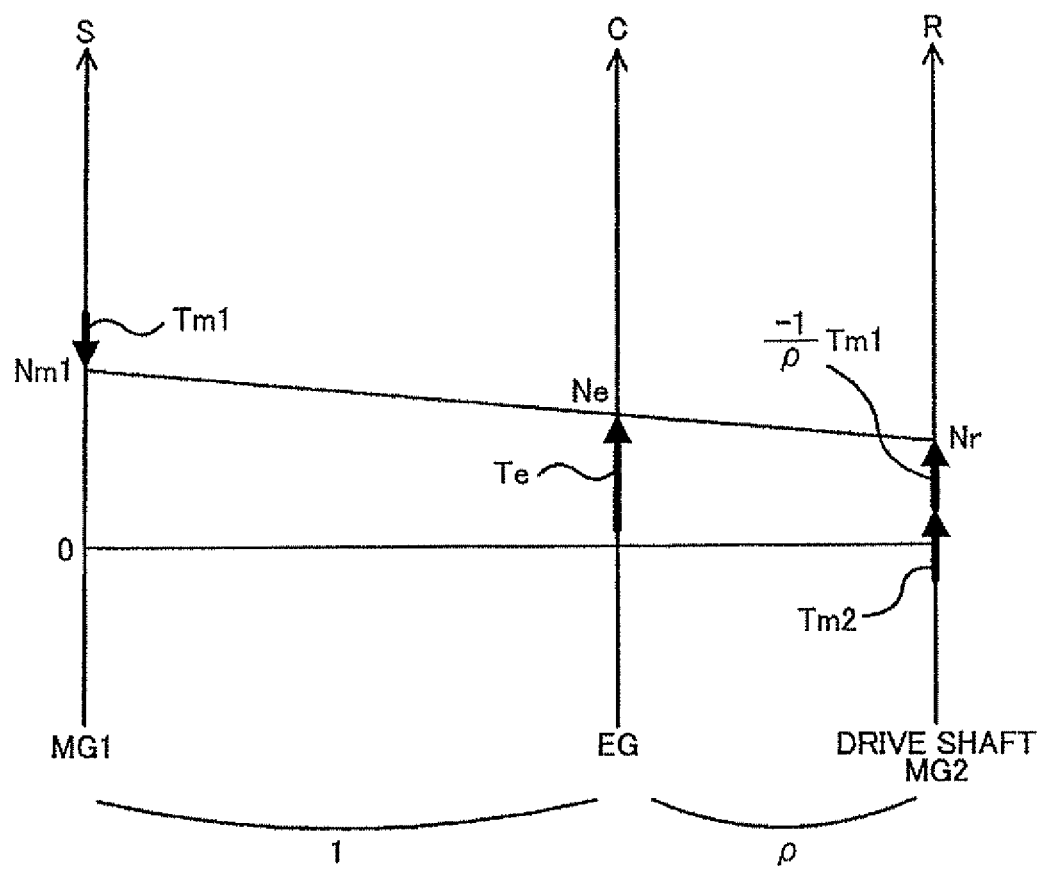
FIG. 3 is an explanatory diagram for explaining an example of a collinear diagram that represents the mechanical relationship between torque and rotational speed in rotating elements of a planetary gear 30.

Upon data input, the estimated actual torque Teest, which is an estimation value of the actual torque that is actually outputted by the engine 22 in accordance with the inputted target torque Tetag of the engine 22, is calculated on the basis of Expression (3) below, which utilizes the inputted torque command Tm1* of the motor MG1, and the gear ratio ρ of the planetary gear 30 (number of teeth of the sun gear/number of teeth of the ring gear) (step S110), and there is calculated, as an output ratio Rt of the engine 22, the quotient of dividing the calculated estimated actual torque Teest by the inputted target torque Tetag (step S120). Therefore, the output ratio Rt is a ratio, with respect to the target torque Tetag of the engine 22, of the estimated actual torque Teest that is estimated to have been actually outputted by the engine 22 in accordance with the target torque Tetag. FIG. 3 illustrates an example of a collinear diagram that denotes a relationship between torque and rotational speed of the rotating elements of the planetary gear 30 at a time of travel in a state where the engine 22 is outputting the torque Te. In the figure, the S axis on the left represents rotational speed of the sun gear, which are the rotational speed Nm1 of the motor MG1, the C axis represents rotational speed of the carrier, which are the rotational speed Ne of the engine 22, and the R axis represents the rotational speed Nr of the ring gear, which are the rotational speed Nm2 of the motor MG2. Expression (3) can be easily derived with reference to this collinear diagram. The two bold arrows on the R axis denote the torque exerted on the drive shaft 36 by the torque Tm1 that is outputted by the motor MG1, and the torque Tm2 that is outputted to the drive shaft 36 by the motor MG2.

$$Teest=-(1+\rho)\cdot Tm1^*/\rho \qquad (3)$$

Next, it is determined whether the calculated output ratio Rt of the engine 22 is smaller than a threshold value for abnormality determination Rtref (for instance, 20%, 30%, 40%, or the like) that is set in advance, through analysis or experimentation, as the lower-limit value of the normal range (allowable range) within which there occurs no output abnormality of dropping output torque of the engine 22 (step S130); when the output ratio Rt is equal to or greater than the threshold value for abnormality determination Rtref, it is determined that no output abnormality of the engine 22 has occurred, and the present routine is terminated.

Figure 4:
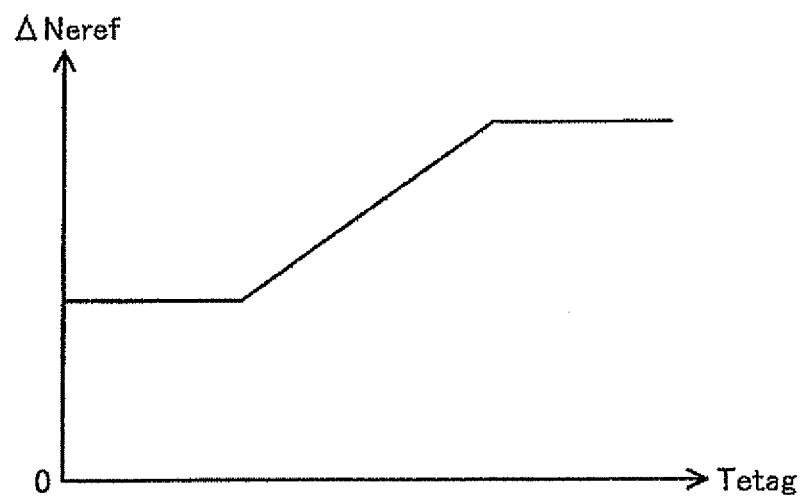
FIG. 4 is an explanatory diagram illustrating an example of a map for setting a threshold value for misdetermination suppression.

When the output ratio Rt of the engine 22 is smaller than the threshold value for abnormality determination Rtref, it is determined that there is a possibility of occurrence of an output abnormality of the engine 22, and there is set a threshold value for misdetermination suppression $\Delta Neref$ for suppressing erroneous determination to the effect that an output abnormality of the engine 22 has occurred, even though that is not the case, on the basis of the inputted target torque Tetag of the engine 22 (step S140). The threshold value for misdetermination suppression $\Delta Neref$ is compared versus the rotational speed variation amount $\Delta Ne$ of the engine 22 in the manner described below. In the working example, a relationship between the target torque Tetag of the engine 22 and the threshold value for misdetermination suppression $\Delta Neref$ is set in advance, through analysis or experimentation, and is stored in a ROM, not shown, as a map for setting a threshold value for misdetermination suppression, so that, given a target torque Tetag, there is set a corresponding threshold value for misdetermination suppression $\Delta Neref$ that is retrieved from the stored map. FIG. 4 illustrates an example of the map for setting a threshold value for misdetermination suppression. As illustrated in the figure, the threshold value for misdetermination suppression $\Delta Neref$ is established to exhibit a trend whereby the higher the target torque Tetag of the engine 22, the greater is a positive value of the threshold value for misdetermination suppression $\Delta Neref$. The reasons for establishing such a trend are explained further on.

Upon setting of the threshold value for misdetermination suppression $\Delta Neref$, the inputted rotational speed variation amount $\Delta Ne$ of the engine 22 and the set threshold value for misdetermination suppression $\Delta Neref$ are compared (step S150). When the rotational speed variation amount $\Delta Ne$ is smaller than the threshold value for misdetermination suppression $\Delta Neref$, it is determined that an output abnormality of the engine 22 has occurred (step S160), and the present routine is terminated. On the other hand, when the rotational speed variation amount ΔNe is equal to or greater than the threshold value for misdetermination suppression ΔNeref, then it is determined that no output abnormality of the engine 22 has occurred, despite the fact that it had been provisionally determined that an output abnormality of the engine 22 may have occurred, and the present routine is terminated as-is.

An explanation follows next on rationale underlying the comparison between the rotational speed variation amount ΔNe of the engine 22 and the threshold value for misdetermination suppression ΔNeref. Times at which the positive value of the rotational speed variation amount ΔNe of the engine 22 becomes greater (i.e. greater increment of the rotational speed Ne of the engine 22), are times at which the rotational speed Ne of the engine 22 rise and at which energy consumption on account of inertia of the rotating system, which includes the engine 22, increases likewise. Accordingly, the output torque of the motor MG1 decreases accompanying the decrease in torque from the engine 22 that acts on the motor MG1 by way of the planetary gear 30, and there is a chance of erroneous determination to the effect that an output abnormality, of dropping output torque from the engine 22, has occurred on account of that decreased output torque of the motor MG1. Accordingly, misdetermination can be suppressed by not determining that an output abnormality of the engine 22 has occurred, even if the output ratio Rt, which is the ratio of the estimated actual torque Teest of the engine 22 with respect to the target torque Tetag, drops below the threshold value for abnormality determination Rtref, when the rotational speed variation amount ΔNe of the engine 22 is equal to or greater than a threshold value. This is the reason that underlies the comparison of the rotational speed variation amount ΔNe of the engine 22 and the threshold value for misdetermination suppression ΔNeref in the working example.

An explanation follows next on the reasons for establishing a trend according to which the threshold value for misdetermination suppression ΔNeref that is compared with the rotational speed variation amount ΔNe of the engine 22 to have a trend of increasing as the target torque Tetag of the engine 22 becomes higher. The decrement in output torque of the motor MG1 derived from a same rotational speed variation amount ΔNe of the engine 22 is uniform, i.e. the decrement in the estimated actual torque Teest of the engine 22 is uniform. By contrast, the influence of the decrement of the estimated actual torque Teest is smaller upon output of high torque by the engine 22 than upon output of low torque, in terms of the ratio of output torque by the engine 22. In other words, the above influence is greater during low torque output by the engine 22 than during high torque output. Therefore, using the threshold value for misdetermination suppression ΔNeref, which is established so as to tend to increase as the target torque Tetag of the engine 22 becomes higher, makes it possible to curtail excessive suppression of the determination of an output abnormality, upon output of high torque by the engine 22, caused by using a comparatively small threshold value, and to curtail the likelihood of disproportionate determination of an output abnormality, upon output of low torque by the engine 22, caused by using a comparatively large threshold value, and makes it possible to determine an output abnormality of the engine 22 yet more properly. For the above reasons, the threshold value for misdetermination suppression ΔNeref is established in the present working example to exhibit a trend whereby the higher the target torque Tetag of the engine 22, the larger is the threshold value for misdetermination suppression ΔNeref. Upon excessive suppression of determination of the output abnormality, upon output of high torque by the engine 22 caused by using a comparatively small threshold value, no output abnormality is determined, despite the fact that a state holds in which, for instance, an output abnormality of the engine 22 should have been determined to have occurred. When an output abnormality is likely to be disproportionately determined, upon output of low torque by the engine 22 caused by using a comparatively large threshold value, an output abnormality is determined to have occurred despite the fact that a state holds in which, for instance, the output abnormality of the engine 22 should not have been determined to have occurred.

In the hybrid automobile 20 of the working example explained above, an output abnormality of the engine 22 is determined to have occurred when the output ratio Rt of estimated actual torque Teest with respect to the target torque Tetag to be outputted by the engine 22 drops below the threshold value for abnormality determination Rtref set in advance, and the rotational speed variation amount ΔNe of the engine 22 is smaller than the threshold value for misdetermination suppression ΔNeref (positive value). The threshold value for misdetermination suppression ΔNeref is set to a threshold value that tends to increase as the target torque Tetag of the engine 22 becomes higher. As a result, it becomes possible to curtail excessive suppression of the determination of an output abnormality upon output of high torque by the engine 22 through the use of a comparatively small threshold value as the threshold value for misdetermination suppression ΔNeref, and to curtail the likelihood of disproportionate determination of an output abnormality upon output of low torque by the engine 22 through the use of a comparatively large threshold value, and makes it possible to determine an output abnormality of the engine 22 yet more properly.

In the hybrid automobile 20 of the working example, those times at which the output ratio Rt (=Teest/Tetag), being a ratio of the estimated actual torque Teest of the engine 22 with respect to the target torque Tetag, is smaller than the threshold value for abnormality determination Rtref, are resorted to as one condition for determining an output abnormality of the engine 22. However, it is also possible to use instead, as one condition for determining an output abnormality of the engine 22, those times at which an output drop ratio Rt2 (=ΔTe/Tetag), being a ratio of a differential torque ΔTe (=Tetag−Teest) obtained by subtracting the estimated actual torque Teest from the target torque Tetag of the engine 22, with respect to the target torque Tetag, is equal to or greater than a threshold value for abnormality determination Rt2ref that is set in advance.

Figure 5:
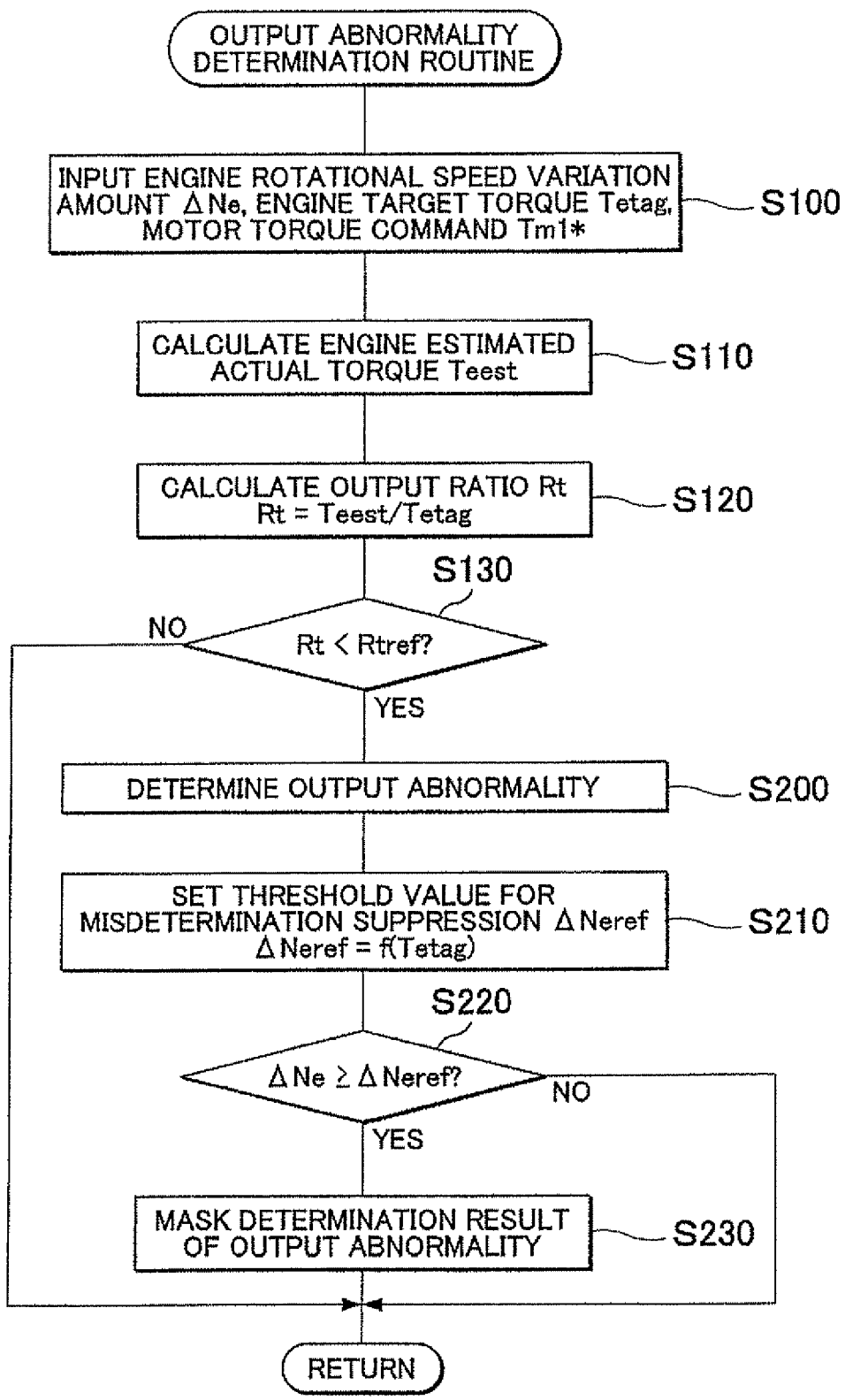
FIG. 5 is a flowchart illustrating an example of an output abnormality determination routine that is executed by the HVECU 70.

In the hybrid automobile 20 of the working example, an output abnormality of the engine 22 is determined to have occurred when the output ratio Rt of the estimated actual torque Teest of the engine 22 with respect to the target torque Tetag drops below the threshold value for abnormality determination Rtref and the rotational speed variation amount ΔNe of the engine 22 is smaller than the threshold value for misdetermination suppression ΔNeref. However, it is also possible, instead of the above, to provisionally determine that an output abnormality of the engine 22 has occurred when it is determined that the output ratio Rt of the estimated actual torque Teest with respect to the target torque Tetag has dropped to less than the threshold value for abnormality determination Rtref, and to mask determination result of the output abnormality of the engine 22 when the rotational speed variation amount ΔNe of the engine 22 becomes equal to or greater than the threshold value for misdetermination suppression ΔNeref, in a state where an output abnormality of the engine 22 has been determined to have occurred. In this case, the output abnormality determination routine of FIG. 5 may be executed instead of the routine of FIG. 2. The routine of FIG. 5 is identical to the routine of FIG. 2, except that herein the process from step S200 to S230 is executed instead of the process from step S140 to S160 of the routine of FIG. 2. Therefore, identical processes are denoted by identical step numbers, and a detailed explanation thereof will be omitted.

When upon execution of the output abnormality determination routine of FIG. 5 the output ratio Rt of the engine 22 is determined, in step S130, to be smaller than the threshold value for abnormality determination Rtref, an output abnormality of the engine 22 is determined to have occurred (step S200). In a state where an output abnormality of the engine 22 is thus determined to have occurred, the threshold value for misdetermination suppression ΔNeref is set on the basis of the target torque Tetag of the engine 22 in the same way as in the process of step S140 of the routine of FIG. 2 (step S210), and the rotational speed variation amount ΔNe of the engine 22 and the threshold value for misdetermination suppression ΔNeref are compared (step S220). When the rotational speed variation amount ΔNe of the engine 22 is equal to or greater than the threshold value for misdetermination suppression ΔNeref, the determination result of output abnormality of the engine 22 is maintained as-is, and the present routine is terminated. On the other hand, when the rotational speed variation amount ΔNe of the engine 22 is smaller than the threshold value for misdetermination suppression ΔNeref, the determination result to the effect that an output abnormality of the engine 22 has occurred is masked (i.e. it is considered that there has been no such determination result) (step S230), and the present routine is terminated. As in the working example, such a process allows determining more properly an output abnormality of the engine 22.

Figure 6:
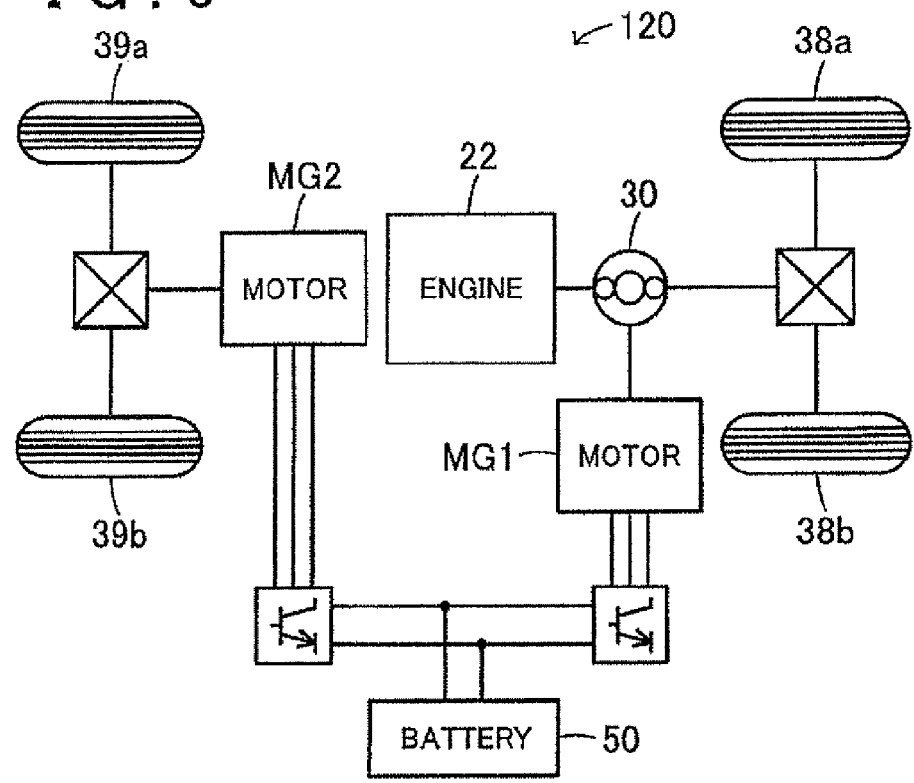
FIG. 6 is a configuration diagram illustrating schematically the configuration of a hybrid automobile 120 in a first variation.

In the hybrid automobile 20 of the working example, the motive power from the motor MG2 is outputted to the drive shaft 36, but a configuration may be adopted, as illustrated in a hybrid automobile 120 of a first variation in FIG. 6, wherein the motive power from the motor MG2 is connected to a second axle (axle connected to the wheels 39a, 39b in FIG. 6) that is different from the first axle to which the drive shaft 36 is connected (axle to which the driving wheels 38a, 38b are connected).

Figure 7:
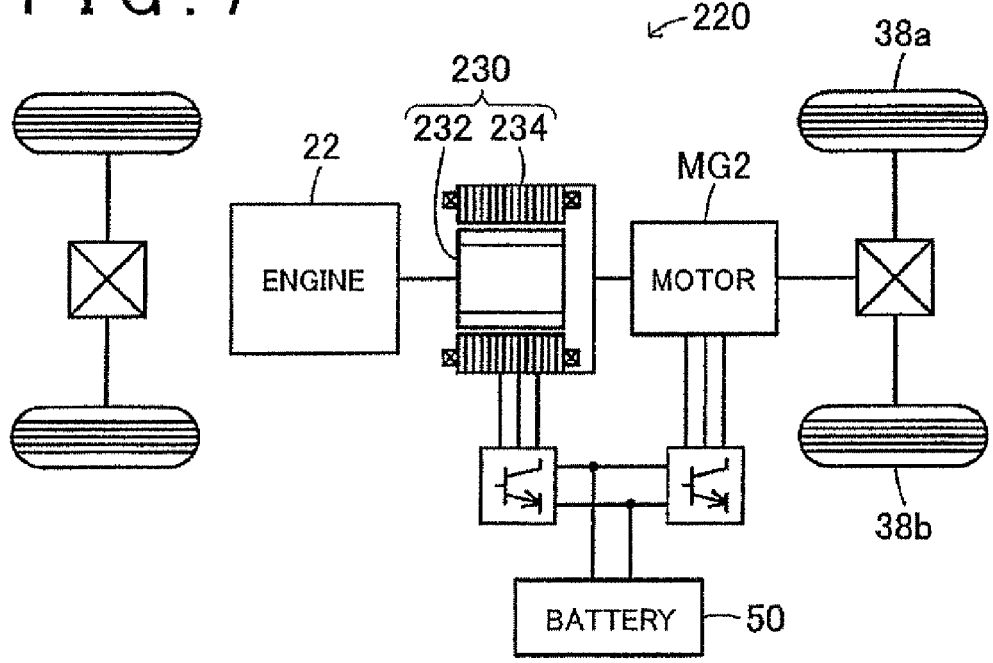
FIG. 7 is a configuration diagram illustrating schematically the configuration of a hybrid automobile 220 in a second variation.

In the hybrid automobile 20 of the working example, the motive power from the engine 22 is outputted to the drive shaft 36 that is connected to the driving wheels 38a, 38b by way of the planetary gear 30. Alternatively, however, as illustrated in a hybrid automobile 220 of a second variation in FIG. 7, there may be provided a pair-rotor motor 230 which has an inner rotor 232 connected to the crankshaft of the engine 22, and an outer rotor 234 connected to the drive shaft 36 that outputs motive power to the driving wheels 38a, 38b, such that the pair-rotor motor 230 transmits part of the motive power from the engine 22 to the drive shaft 36 and converts the remaining motive power into electric power.

In the working example, the invention has been explained in the form of the hybrid automobile 20, but the invention may be embodied as an abnormality determination device in vehicles other than automobiles, (for instance, in trains or the like).

In the working example, the engine 22 functions as an "engine"; the motor MG1 functions as a "motor"; the HVECU 70 functions as an abnormality determination unit", in that the HVECU 70 executes the output abnormality determination routine of FIG. 2 that involves calculating the estimated actual torque Teest corresponding to the target torque Tetag of the engine 22, and determining that an output abnormality of the engine 22 has occurred when the output ratio Rt of the estimated actual torque Teest with respect to the target torque Tetag is smaller than the threshold value for abnormality determination Rtref and the rotational speed variation amount ΔNe of the engine 22 is smaller than the threshold value for misdetermination suppression ΔNeref that is established so as to tend to increase as the target torque Tetag becomes higher; the motor MG2 functions as a "second motor"; the planetary gear 30 functions as a "planetary gear"; and the battery 50 functions as a "battery".

Herein, the "engine" is not limited to an engine that uses gasoline or diesel as a fuel, and may be an engine of some other type, for instance a hydrogen engine. The "first motor" is not limited to the motor MG1 that is configured in the form of a synchronous generator motor, and may be a motor of some other type, for instance an induction motor, so long as the motor is capable of outputting torque to the output shaft of the engine. The "abnormality determination unit" is not limited to calculating the estimated actual torque Teest corresponding to the target torque Tetag of the engine 22, and determining that an output abnormality of the engine 22 has occurred when the output ratio Rt of the estimated actual torque Teest with respect to the target torque Tetag is smaller than the threshold value for abnormality determination Rtref and the rotational speed variation amount ΔNe of the engine 22 is smaller than the threshold value for misdetermination suppression ΔNeref that is established so as to tend to increase as the target torque Tetag becomes higher, and may be any means, so long as it is means for determining that an output abnormality of the engine has occurred when the actual torque estimated as the torque actually outputted by the engine and estimated using the torque of the motor falls below a lower limit of an allowable range for a target torque that is to be outputted by the engine, and when an amount of increase in a rotational speed is smaller than a threshold value for misdetermination suppression, the threshold value for misdetermination suppression being a threshold value that tends to increase as the target torque becomes higher, for instance means for provisionally determining that an output abnormality of the engine 22 has occurred and, thereafter, masking the determination result. The "second motor" is not limited to the motor MG2 that is configured in the form of a synchronous generator motor, and may be a motor of other type, for instance an induction motor, so long as a rotating shaft of the motor is connected to the drive shaft. The "planetary gear" is not limited to the above-described planetary gear 30, and may be any planetary gear, so long as three rotating elements are connected to three shafts, namely the drive shaft that is coupled to an axle, the output shaft of the engine, and the rotating shaft of the motor, for instance a planetary gear that relies on a double pinion-type planetary gear, or a planetary gear that is connected to four or more shafts and which results from combining a plurality of planetary gears. The "battery" is not limited to a battery configured in the form of a lithium ion secondary battery, and may be any battery, so long as the battery exchanges electric power with the motor and the second motor.

Modes for carrying out the invention have been explained above based on working examples, but the invention is not limited to any of these working examples, and, needless to say, may be embodied in various other ways without departing from the scope of the invention.

The invention can be used in the automotive manufacturing industry.

The abnormality determination unit may determine that the actual torque has dropped below the allowable range compared to the target torque when a ratio of the actual torque with respect to the target torque is smaller than a threshold value for abnormality determination set in advance.

When it is determined that the actual torque falls below a lower limit of an allowable range for a target torque, the abnormality determination unit may determine that an output abnormality of the engine has occurred, and if the increment in a rotational speed of the engine is equal to or greater than the threshold value for misdetermination suppression when the abnormality determination unit determines that an output abnormality of the engine has occurred, the abnormality determination unit may ignore (mask) the determination result of output abnormality of the engine.

The vehicle may further include a planetary gear that has three rotating elements respectively connected to a drive shaft coupled to a first axle, the output shaft of the engine, and a rotating shaft of the first motor; a second motor that has a rotating shaft connected to the drive shaft; and a battery that exchanges electric power with the first motor and the second motor.

What is claimed is:

1. An abnormality determination device of a vehicle that includes an engine and a first motor that is configured to output a torque to an output shaft of the engine, the abnormality determination device determining an output abnormality of dropping output of the engine in the vehicle, and comprising:
    an abnormality determination unit that is configured to determine that an engine output abnormality has occurred when conditions i) and ii) are both satisfied:
        i) a condition that an actual torque that is estimated, based on a torque of the first motor, as a torque actually output from the engine falls below a lower limit of an allowable range for a target torque to be output from the engine; and
        ii) a condition that an amount of increase in a rotational speed of the engine is smaller than a threshold value for misdetermination suppression, which is a threshold value that is larger as the target torque is higher.

2. The abnormality determination device of a vehicle according to claim 1, wherein
    the abnormality determination unit is configured to determine that the actual torque has dropped below the allowable range compared to the target torque when a ratio of the actual torque with respect to the target torque is smaller than a threshold value for abnormality determination set in advance.

3. The abnormality determination device of a vehicle according to claim 1, wherein
    when i) a condition that the actual torque falls below a lower limit of an allowable range for a target torque, the abnormality determination unit is configured to determine that an output abnormality of the engine has occurred, and if the increment in a rotational speed of the engine is equal to or greater than the threshold value for misdetermination suppression when the abnormality determination unit determines that an output abnormality of the engine has occurred, the abnormality determination unit is configured to ignore the determination result of output abnormality of the engine.

4. The abnormality determination device of a vehicle according to claim 1, wherein the vehicle further includes:
    a planetary gear that has three rotating elements respectively connected to a drive shaft coupled to a first axle, the output shaft of the engine, and a rotating shaft of the first motor;
    a second motor that has a rotating shaft connected to the drive shaft; and
    a battery that exchanges electric power with the first motor and the second motor.

5. The abnormality determination device of a vehicle according to claim 1, wherein the vehicle further includes:
    a planetary gear that has three rotating elements respectively connected to a drive shaft coupled to a first axle, the output shaft of the engine, and a rotating shaft of the first motor;
    a second motor that has a rotating shaft connected to a second axle that is different from the first axle to which the drive shaft is connected; and
    a battery that exchanges electric power with the first motor and the second motor.

6. The abnormality determination device of a vehicle according to claim 1, wherein
    the abnormality determination unit is configured to calculate a differential torque by subtracting the estimated actual torque from the target torque, and is configured to determine that the actual torque falls below a lower limit of an allowable range for a target torque when a ratio of the differential torque with respect to the target torque is equal to or greater than a threshold value for abnormality determination set in advance.

7. An abnormality determination method for a vehicle,
    the vehicle including an engine and a first motor that is configured to output a torque to an output shaft of the engine, and
    the abnormality determination method comprising:
        determining that an output abnormality of the engine has occurred when conditions i) and ii) are both satisfied:
            i) a condition that an actual torque that is estimated, based on a torque of the first motor, as a torque actually output from the engine falls below a lower limit of an allowable range for a target torque to be output from the engine; and
            ii) a condition that an amount of increase in a rotational speed of the engine is smaller than a threshold value for misdetermination suppression, which is a threshold value that is larger as the target torque is higher.

* * * * *